United States Patent
Stravers

(10) Patent No.: US 12,430,043 B1
(45) Date of Patent: Sep. 30, 2025

(54) MEMORY PROTECTION UNIT WITH SECURE DELEGATION

(71) Applicant: Synopsys, Inc., Sunnyvale, CA (US)

(72) Inventor: Paul Stravers, Eindhoven (NL)

(73) Assignee: SYNOPSYS, INC., Sunnyvale, CA (US)

( * ) Notice: Subject to any disclaimer, the term of this patent is extended or adjusted under 35 U.S.C. 154(b) by 61 days.

(21) Appl. No.: 18/615,405

(22) Filed: Mar. 25, 2024

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

2021/0311884 A1* 10/2021 Grocutt ................ G06F 3/0638

\* cited by examiner

*Primary Examiner* — Jane W Benner
(74) *Attorney, Agent, or Firm* — Laxman Sahasrabuddhe; Park, Vaughan, Fleming & Dowler LLP

(57) ABSTRACT

A memory protection unit (MPU) configuration request may be received, where the MPU configuration request may include a memory protection rule. A first entry in a first MPU circuit may be determined which matches the memory protection rule. A compliance result may be determined based on checking if the memory protection rule complies with the first entry. The memory protection rule may be written in a second MPU circuit based on the compliance result.

20 Claims, 7 Drawing Sheets

MEMORY PROTECTION UNIT WITH SECURE DELEGATION

TECHNICAL FIELD

The present disclosure generally relates to computer systems. More specifically, the present disclosure relates to a memory protection unit with secure delegation.

BACKGROUND

A memory protection unit (MPU) may refer to circuitry which may be used to enforce a set of memory protection rules for accessing a memory device. A memory protection rule in the set of memory protection rules may specify a lower and an upper address bound of a memory region and an access permission which applies to the memory region. The MPU may enforce the set of memory protection rules when the memory device is accessed.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
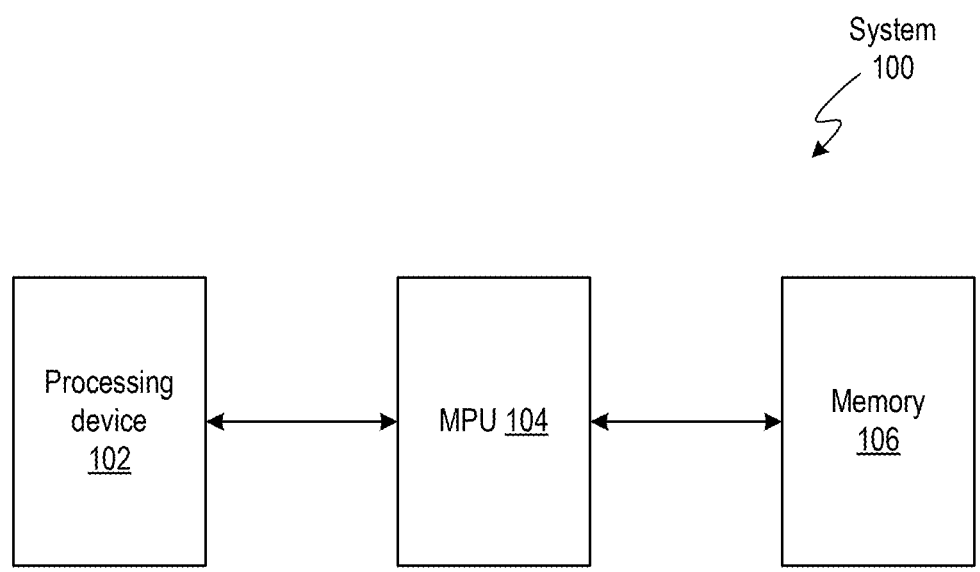
FIG. 1A illustrates a system in accordance with some embodiments described herein.

Aspects of the present disclosure relate to a memory protection unit with secure delegation. A computer system (e.g., an embedded computer system executing a real time operating system) may include hardware resources which may be used by multiple software stacks. The software stacks may not trust each other and therefore it is important to ensure that a specific hardware resource is allowed to be accessed only by software stacks which have explicitly been given permission to access the hardware resource.

An MPU may be used to enforce a set of memory protection rules. Specifically, the MPU may include multiple entries, where each entry may correspond to a memory protection rule in the set of memory protection rules, and where each entry may store the lower and upper address bound of a memory region and an access permission which applies to the memory region. The entries in the MPU may be populated with address regions and the corresponding access permissions during a configuration phase, and the MPU may use the entries to enforce the set of memory protection rules during an operational phase.

It may be desirable to enable the software stacks to partition the hardware resources in a hierarchical manner. A first software entity (which may include, but is not limited to, a process or a thread executing on a processing device) may pass control to a second software entity. The term "pass control" may refer to a context switch, e.g., when the first software entity passes control to the second software entity, the execution of the first software entity may be paused or terminated, and the execution of the second software entity may be resumed or started. The term "delegator" may refer to the first software entity which passes control, and the term "delegate" may refer to the second software entity to which control is passed. For example, a parent process (the first software entity) may create a child process (the second software entity), and pass control to the child process. In this example, the parent process is the delegator, and the child process is the delegate.

A delegator may set up the lower and upper bounds of a memory region which are accessible to a delegate, and then pass control to the delegate to refine the lower and upper bounds of the memory region (e.g., based on the actual memory used by the delegate). It may be desirable to ensure that the delegate is not able to extend the memory region allocated to the delegate beyond the lower and upper bounds which were set by the delegator. The term "delegator-delegate hierarchy" may refer to a scenario in which multiple levels of delegates exist, and where delegates at a particular level in the delegator-delegate hierarchy may act as delegators to the delegates in the next level in the delegator-delegate hierarchy. The term "ancestor" may refer to delegators in one or more of the previous levels in the delegator-delegate hierarchy. For example, if a first process delegates to a second process which delegates to a third process, then the first process and the second process may be referred to as ancestors of the third process in the delegator-delegate hierarchy.

Some MPUs allow a delegate to configure the MPU with no regards to the bounds set by the delegator. In these MPUs, two MPUs are checked in the operational phase—a first MPU which was configured by the delegator and a second MPU which was configured by the delegate. Only if both MPUs sanction the memory access, then the access is allowed. Otherwise, the memory access is rejected, and an error is reported. In these systems, multiple MPUs are used so that each level in the delegate hierarchy has a separate MPU, and multiple MPUs are checked during the operational phase. Having multiple MPUs in the system and checking multiple MPUs during the operational phase increases the silicon area and the power consumption of the system, which is disadvantageous.

Some embodiments described herein feature a circuit which is used during the MPU configuration phase. The functionality of the circuit may include, but is not limited to, the following: (1) when a request to configure an MPU with an entry is received, the memory address region and the access permission associated with the entry may be checked against the set of memory protection rules currently being enforced by the MPU, (2) if the memory region and/or the access permission are found to violate the set of memory protection rules which are currently being enforced by the MPU, then the request to configure the MPU with the entry may be denied, and an error may be reported, and (3) on the other hand, if the memory region and the access permission do not violate the set of memory protection rules which are currently being enforced by the MPU, then the request to configure the MPU with entry may be allowed, and the entry may be added to the MPU or an existing entry in the MPU may be replaced with the entry which was received.

In some embodiments described herein, a delegator may configure the MPU with a set of memory mapped resources. The delegator may then pass control to a delegate, which can continue configuring the MPU, and may pass control to its own delegates, and so forth, thus creating a delegator-delegate hierarchy. Embodiments described herein ensure that a delegate can only reduce the amount of, and/or access to, the allocated memory mapped resources, but the delegate can never increase the amount of, and/or access to, the allocated memory mapped resources which were configured by any of the ancestors of the delegate in the delegator-delegate hierarchy. In other words, regardless of the number of delegation levels in the delegator-delegate hierarchy, embodiments described herein ensure that a delegate cannot configure an MPU to increase the amount of, and/or access to, the memory resources which were allocated by its ancestors in the delegator-delegate hierarchy. Thus, embodiments described herein only use a constant number of MPUs (e.g., either one MPU or two MPUs depending on the implementation) and the number of MPUs used in the system do not scale up with the number of delegation levels in the delegator-delegate hierarchy.

Technical advantages of embodiments described herein may include, but are not limited to, (1) reduce silicon area by obviating the need to use multiple MPUs when the delegator-delegate hierarchy has multiple levels, (2) reduce power consumption by obviating the need to check multiple MPUs during the operational phase when the delegator-delegate hierarchy has multiple levels, (3) improving the security of systems which use MPUs by ensuring that a delegate cannot configure an MPU to increase the amount of, and/or access to, the memory resources which were allocated by the ancestors of the delegate in a delegator-delegate hierarchy.

FIG. 1A illustrates a system in accordance with some embodiments described herein.

System 100 (e.g., an embedded system) may include a processing device 102, MPU 104, and memory 106. All accesses to memory 106 may be transparently checked by MPU 104. Specifically, processing device 102 may provide a memory access request to MPU 104, where the memory access request may include a memory address in memory 106 and an access command. MPU 104 may check if the memory address and the access command are compliant with a set of memory protection rules (i.e., the memory address and the access command do not violate the set of memory protection rules). If the memory address and the access command are compliant with a set of memory protection rules, then MPU 104 may allow processing device 102 to perform the access command on the memory address in memory 106. On the other hand, if the memory address and the access command violate at least one memory protection rule, then MPU 104 may not allow processing device 102 to perform the access command on the memory address in memory 106 and may generate an interrupt which may be communicated to processing device 102.

Figure 1B:
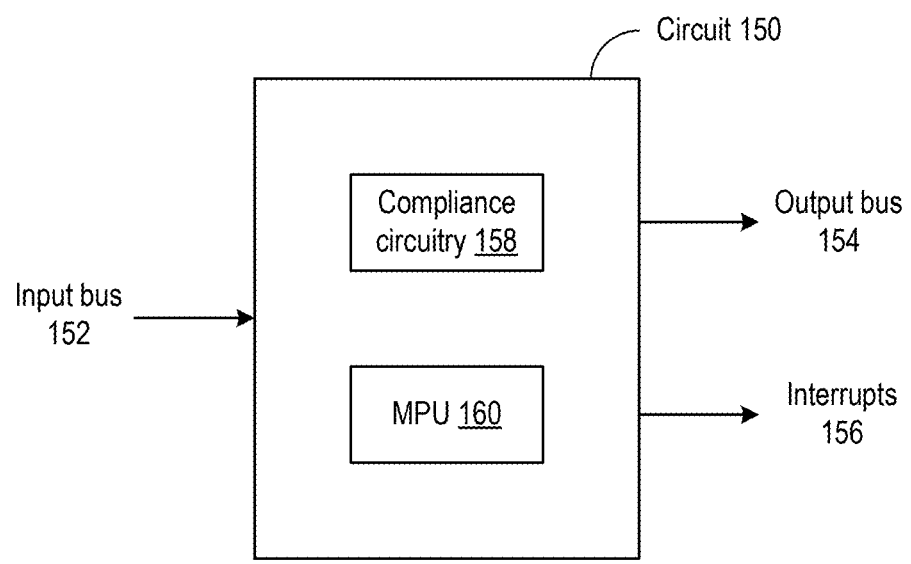
FIG. 1B illustrates a circuit for secure delegation in accordance with some embodiments described herein.

FIG. 1B illustrates a circuit for secure delegation in accordance with some embodiments described herein.

Circuit 150 may communicate with a processing device (not shown in FIG. 1B) using input bus 152 and interrupts 156 and may communicate with a memory (not shown in FIG. 1B) using output bus 154 (e.g., during an operational phase, circuit 150 may provide a memory access request to the memory via output bus 154 if the memory access request is compliant with a set of memory protection rules). Circuit 150 may include MPU 160 to store a set of memory protection rules. Circuit 150 may include compliance circuitry 158 which may be used to configure MPU 160 with a set of memory protection rules during a configuration phase. MPU 160 may be used to enforce the set of memory protection rules during an operational phase. Specifically, a processing device may use input bus 152 to provide a memory protection rule to circuit 150 during a configuration phase. Circuit 150 may store the memory protection rule in MPU 160 if the compliance circuitry 158 determines that the memory protection rule does not increase the amount of, and/or access to, the memory resources that are currently allocated. On the other hand, compliance circuitry 158 may generate an error condition (which may be communicated to a processing device using interrupts 156) if compliance circuitry 158 determines that the memory protection rule increases the amount of, and/or the access to, the memory resources that are currently allocated.

Figure 2A:
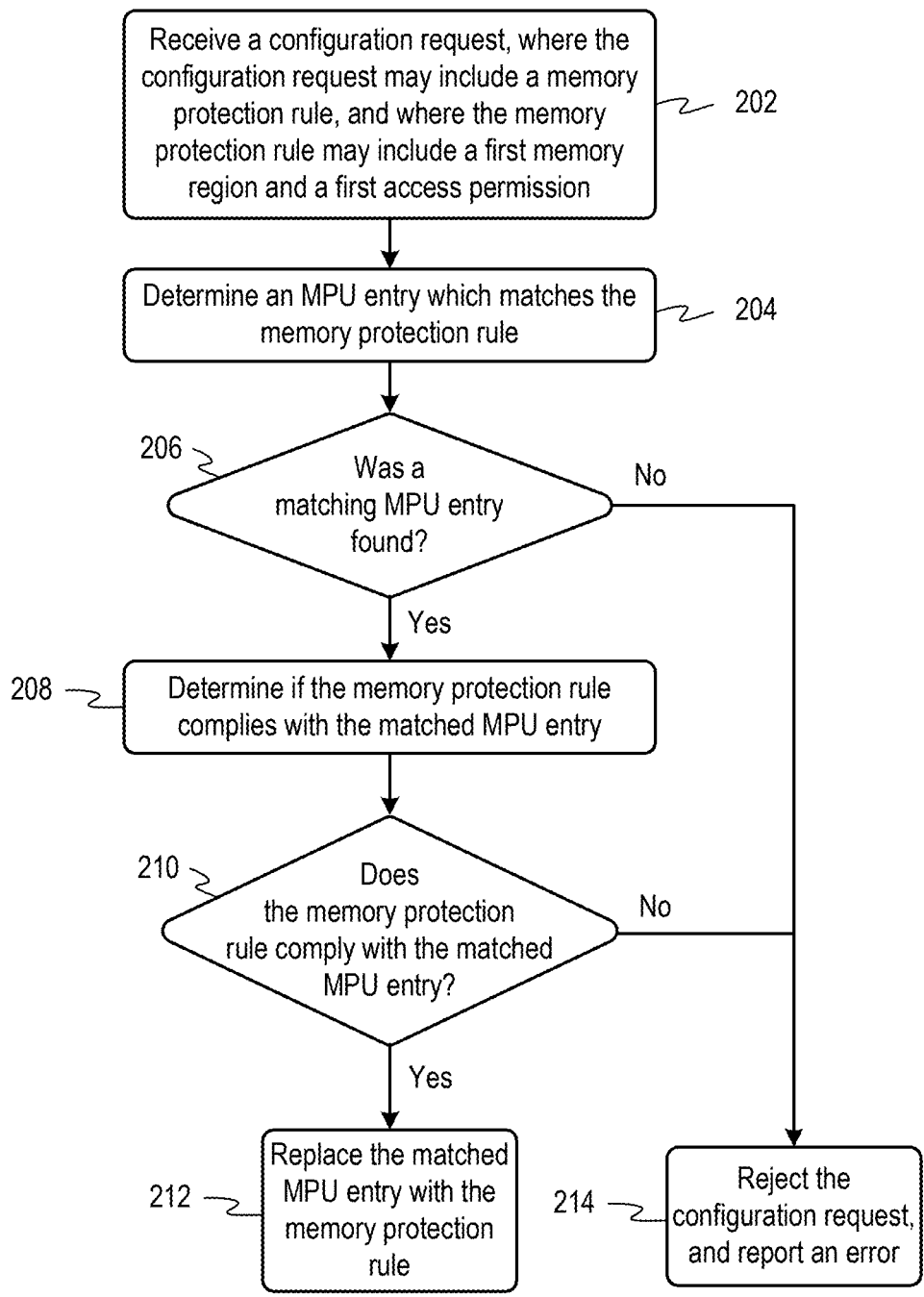
FIG. 2A illustrates a process for MPU configuration with secure delegation in accordance with some embodiments described herein.

FIG. 2A illustrates a process for MPU configuration with secure delegation in accordance with some embodiments described herein.

A configuration request may be received, where the configuration request may include a memory protection rule, and where the memory protection rule may include a first memory region and a first access permission (at 202).

An MPU entry which matches the memory protection rule may be determined (at 204). Each MPU entry may store a memory region and an access permission. A memory protection rule may match an MPU entry if the first memory region associated with the memory protection rule is within a second memory region associated with the MPU entry. For example, suppose the lower and upper bounds of the first memory region associated with the memory protection rule are L1 and U1, respectively, and the lower and upper bounds of the second memory region associated with the MPU entry are L2 and U2, respectively. In this scenario, it may be determined that the first memory region associated with the memory protection rule is within the second memory region associated with the MPU entry if L1≥L2 and U1≤U2.

If a matching MPU entry is found (the "Yes" branch from 206), then it may be determined if the memory protection rule complies with the matched MPU entry (at 208). On the other hand, if no matching MPU entry is found (the "No" branch from 206), then the configuration request may be rejected, and an error may be reported (at 214).

A memory protection rule may comply with a matching MPU entry if the first access permission associated with the memory protection rule is at least as restrictive as a second access permission associated with the matched MPU entry. For example, suppose the first access permission associated with the memory protection rule is a read-and-write permission, and a second access permission associated with the matched MPU entry is a read-only permission. The first access permission is not as restrictive as the second access permission as the first access permission allows an additional write permission. In this scenario, it may be determined that the memory protection rule does not comply with the matched MPU entry.

If the memory protection rule complies with the matched MPU entry (the "Yes" branch from 210), then the matched MPU entry may be replaced with the memory protection rule (at 212). Specifically, the first memory region and the first access permission associated with the memory protection rule may be written into the matched MPU entry. On the other hand, if the memory protection rule does not comply with the matched MPU entry (the "No" branch from 210), then the configuration request may be rejected, and an error may be reported (at 214).

Figure 2B:
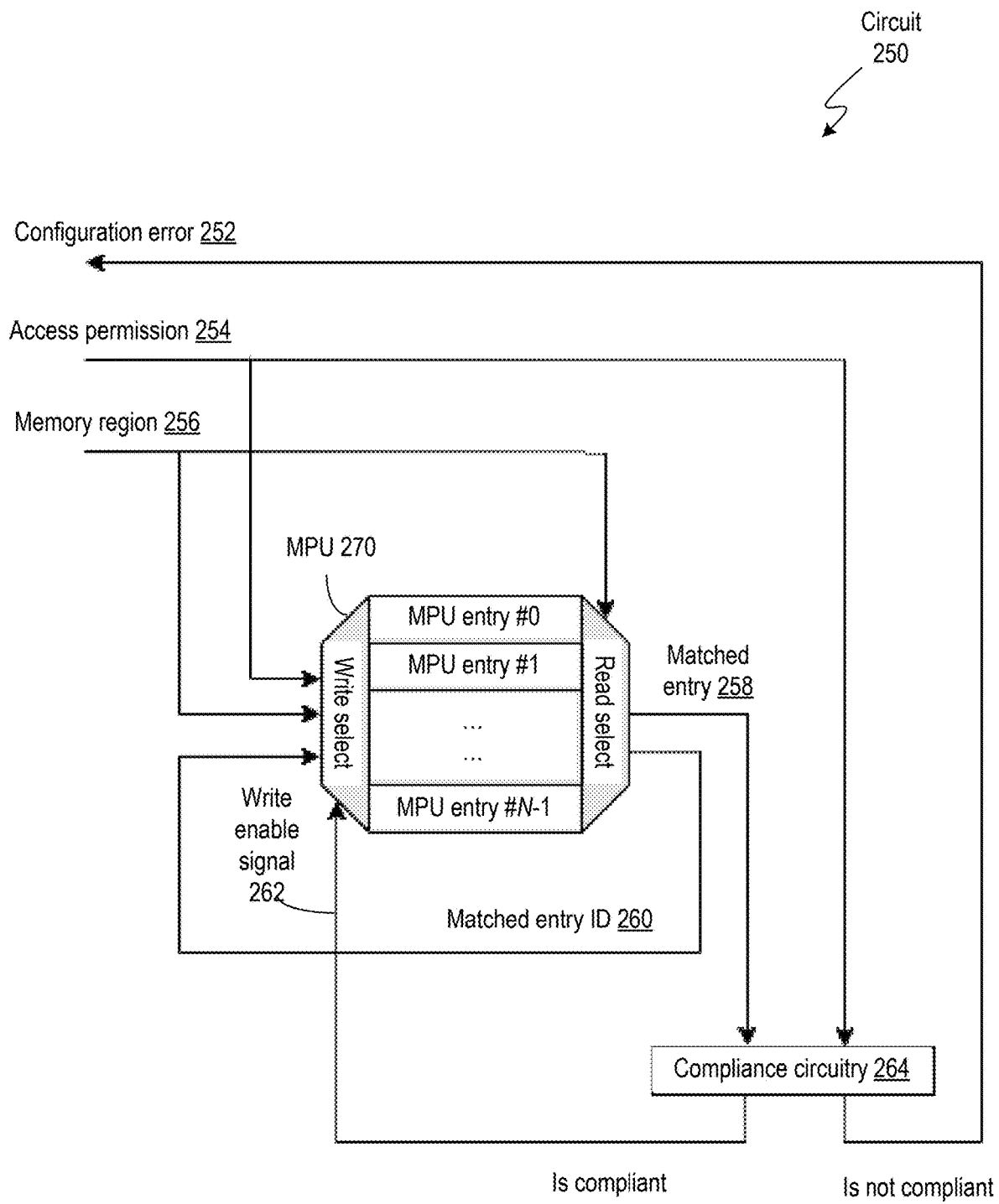
FIG. 2B illustrates a circuit for MPU configuration with secure delegation in accordance with some embodiments described herein.

FIG. 2B illustrates a circuit for MPU configuration with secure delegation in accordance with some embodiments described herein.

Circuit 250 may implement the process illustrated in FIG. 2A and may include compliance circuitry 264 and MPU 270. A configuration request may be received, where the configuration request includes a memory protection rule, and where the memory protection rule includes memory region 256 and access permission 254. Memory region 256 may be provided to a read select interface of MPU 270. MPU 270 may store N MPU entries (shown in FIG. 2B as MPU entry #0 through MPU entry #N−1). MPU 270 may determine an MPU entry (i.e., matched entry 258) in MPU 270 which matches the memory region 256. MPU 270 may also provide the matched entry identifier (ID) 260 to the write select interface of MPU 270. In some embodiments described herein, MPU 270 may use a content addressable memory to store the MPU entries.

Access permission 254 and matched entry 258 may be provided to compliance circuitry 264, which may determine if the access permission 254 is at least as restrictive as the access permission associated with the matched entry 258. If the access permission 254 is less restrictive than the access permission associated with the matched entry 258, then compliance circuitry 264 may report configuration error 252. If the access permission 254 is at least as restrictive as the access permission associated with the matched entry 258, then compliance circuitry 264 may determine that the configuration request is compliant and provide write enable signal 262 to the write select interface of MPU 270, which may cause the memory region 256 and access permission 254 to be written at the matched entry ID 260 in MPU 270.

Some embodiments described herein (e.g., the embodiment shown in FIGS. 2A-2B) may use a single MPU, and the number of configured entries in the MPU may not increase beyond the number of entries that were preloaded by the delegator.

Some embodiments described herein may use two MPUs, e.g., MPUs MPU_1 and MPU_2. The delegator may configure memory regions and access permissions in MPU_1 and the delegate may configure memory regions and access permissions in MPU_2. A two-MPU embodiment may provide more flexibility than a single-MPU embodiment because the number of entries in MPU_2 can be different than the number of entries in MPU_1. Specifically, MPU_2 may have more entries than MPU_1.

Figure 3A:
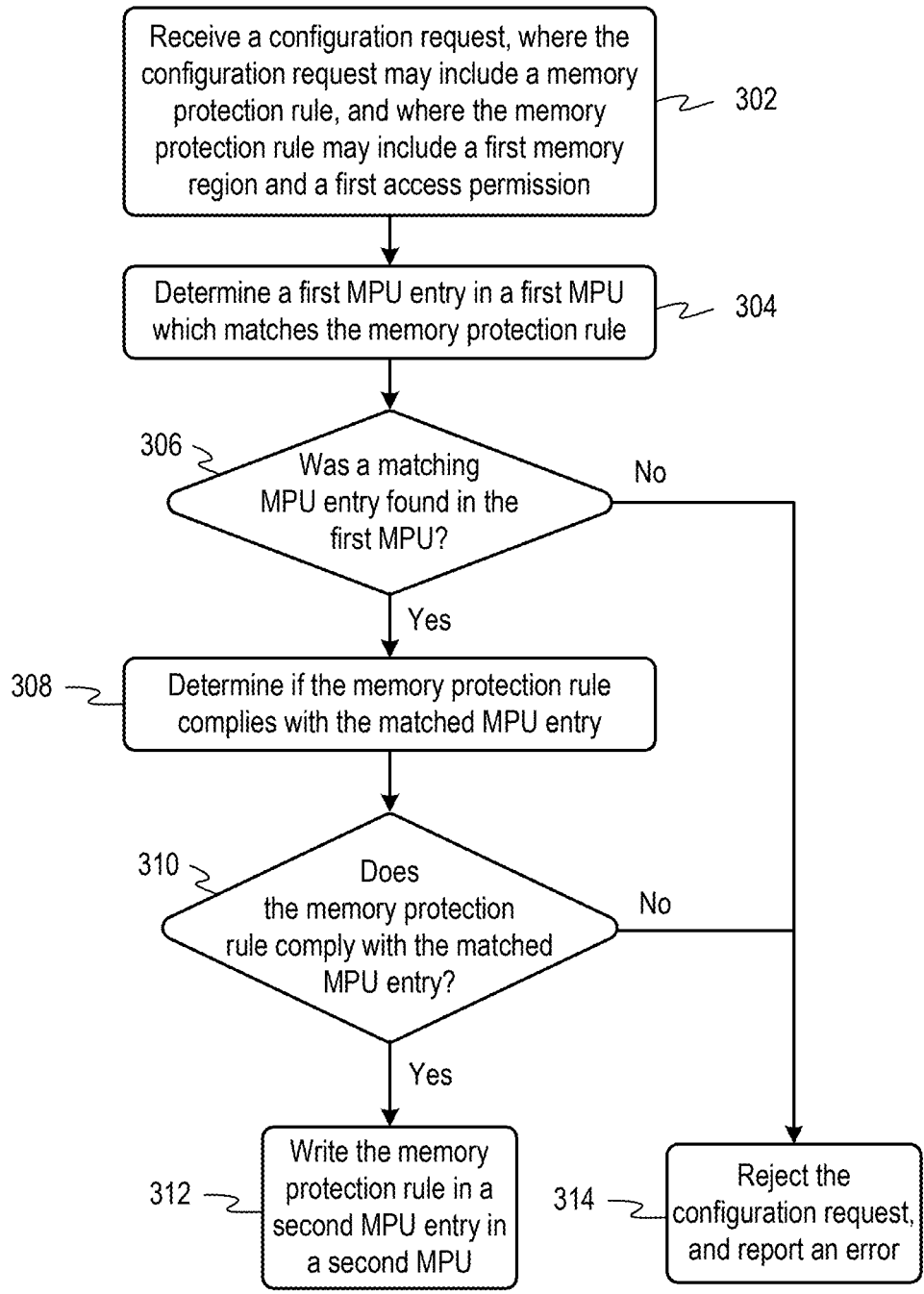
FIG. 3A illustrates another process for MPU configuration with secure delegation in accordance with some embodiments described herein.

FIG. 3A illustrates another process for MPU configuration with secure delegation in accordance with some embodiments described herein.

A configuration request may be received, where the configuration request may include a memory protection rule, and where the memory protection rule may include a first memory region and a first access permission (at 302).

A first MPU entry in a first MPU which matches the memory protection rule may be determined (at 304).

If a matching MPU entry in the first MPU is found (the "Yes" branch from 306), then it may be determined if the memory protection rule complies with the matched MPU entry (at 308). On the other hand, if no matching MPU entry in the first MPU is found (the "No" branch from 306), then the configuration request may be rejected, and an error may be reported (at 314).

If the memory protection rule complies with the matched MPU entry (the "Yes" branch from 310), then the memory protection rule may be written into a second MPU entry in a second MPU (at 312). Specifically, the second MPU entry in the second MPU may store the second memory region and the second access permission associated with the memory protection rule. On the other hand, if the memory protection rule does not comply with the matched MPU entry (the "No" branch from 310), then the configuration request may be rejected, and an error may be reported (at 314).

Figure 3B:
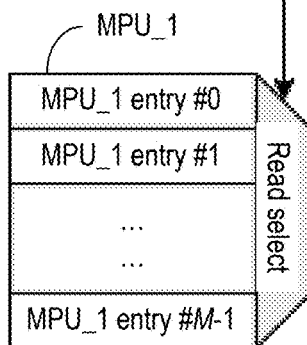
FIG. 3B illustrates another circuit for MPU configuration with secure delegation in accordance with some embodiments described herein.
Figure 3B:
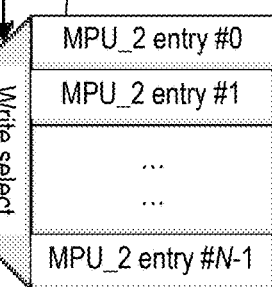

FIG. 3B illustrates another circuit for MPU configuration with secure delegation in accordance with some embodiments described herein.

Circuit 350 may implement the process illustrated in FIG. 3A and may include compliance circuitry 364 and MPUs MPU_1 and MPU_2. MPU_1 may store M MPU entries (shown in FIG. 3B as MPU_1 entry #0 through MPU_1 entry #M−1), and MPU_2 may store N MPU entries (shown in FIG. 3B as MPU_2 entry #0 through MPU_2 entry #N−1). In some embodiments described herein, MPUs MPU_1 and MPU_2 may use a content addressable memory to store the MPU entries.

A configuration request may be received, where the configuration request includes a memory protection rule, and where the memory protection rule includes memory region 356 and access permission 354. An MPU entry ID 360 may also be received, which may indicate the entry in MPU_2 where the memory protection rule is desired to be written. Memory region 356 may be provided to a read select interface of MPU_1. MPU_1 may determine an MPU entry (i.e., matched entry 358) in MPU_1 which matches the memory region 356.

Compliance circuitry 364 may determine if the access permission 354 is at least as restrictive as the access permission associated with the matched entry 358. If the access permission 354 is less restrictive than the access permission associated with the matched entry 358, then compliance circuitry 364 may report configuration error 352. If the access permission 354 is at least as restrictive as the access permission associated with the matched entry 358, then compliance circuitry 364 may determine that the configuration request is compliant and provide write enable signal 362 to the write select interface of MPU_2, which may cause the memory region 356 and access permission 354 to be written at MPU entry ID 360 in MPU_2.

Some embodiments described herein may feature a circuit which may include (1) an interface to receive an MPU configuration request, where the MPU configuration request may include a memory protection rule, (2) a first circuit to determine a first entry in a first set of entries which matches the memory protection rule, (3) a second circuit to determine a compliance result based on checking if the memory protection rule complies with the first entry, and (4) a third circuit to store the memory protection rule in a second set of entries based on the compliance result.

In some embodiments described herein, the second set of entries may be the same as the first set of entries.

In some embodiments described herein, the first circuit may generate an error signal in response to determining that no entry in the first set of entries matches the memory protection rule.

In some embodiments described herein, the second circuit may generate an error signal when the compliance result indicates that the memory protection rule does not comply with the first entry.

In some embodiments described herein, the memory protection rule may include a first memory region and a first access permission.

In some embodiments described herein, the memory protection rule may comply with the first entry when the first access permission is at least as restrictive as a second access permission associated with the first entry.

In some embodiments described herein, the first entry may match the memory protection rule when a first memory region associated with the memory protection rule is within a second memory region associated with the first entry.

Figure 4:
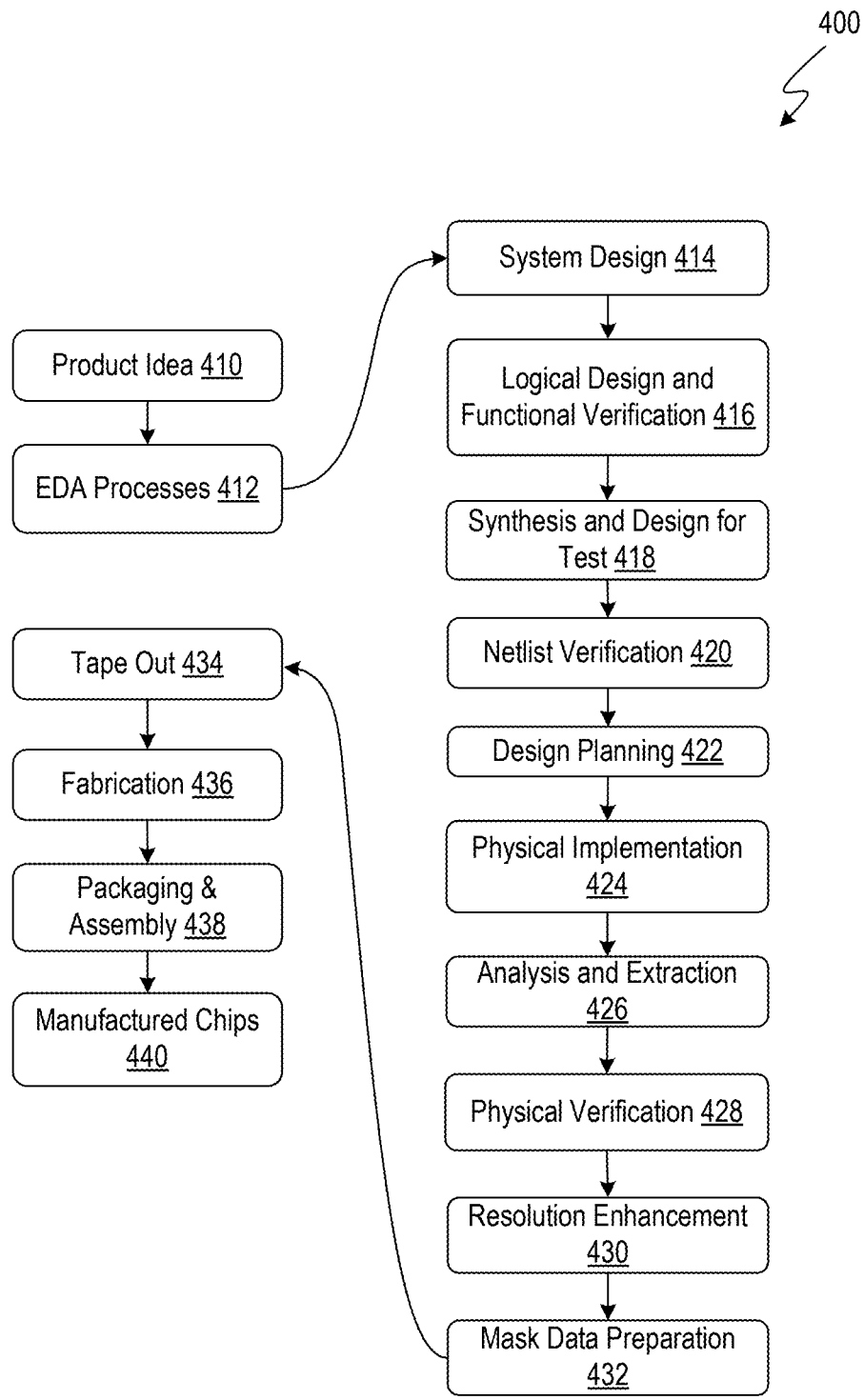
FIG. 4 illustrates an example set of processes used during the design, verification, and fabrication of an article of manufacture such as an integrated circuit to transform and verify design data and instructions that represent the integrated circuit.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 4. The processes described by be enabled by EDA products (or EDA systems).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
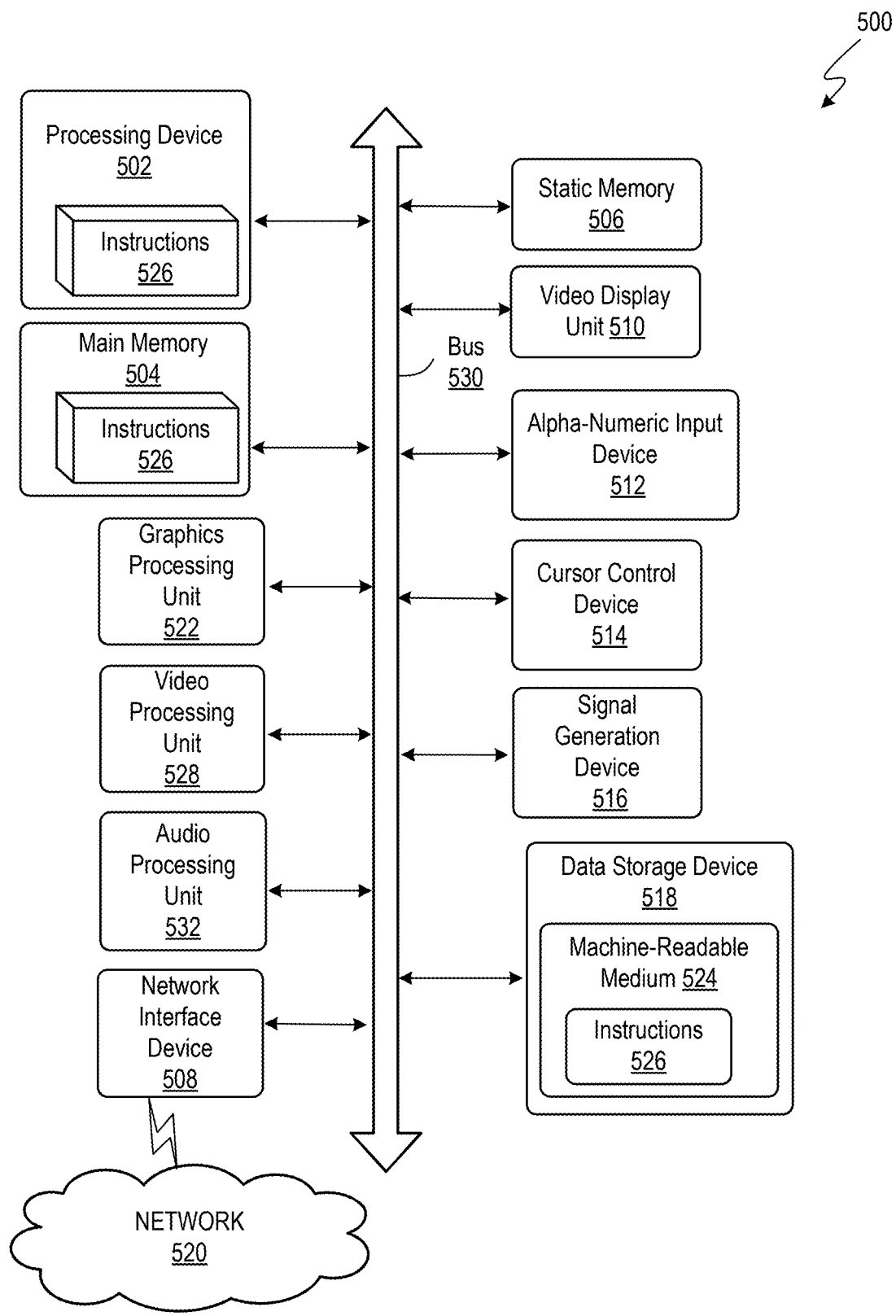
FIG. 5 illustrates an example machine of a computer system within which a set of instructions, for causing the machine to perform any one or more of the methodologies discussed herein, may be executed.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving a memory protection unit (MPU) configuration request, wherein the MPU configuration request includes a memory protection rule;
   determining a first entry in a first MPU circuit which matches the memory protection rule;
   determining a compliance result based on checking if the memory protection rule complies with the first entry; and
   writing the memory protection rule in a second MPU circuit based on the compliance result.

2. The method of claim 1, wherein the second MPU circuit is the same as the first MPU circuit.

3. The method of claim 1, further comprising generating an error signal in response to determining that no entry in the first MPU circuit matches the memory protection rule.

4. The method of claim 1, further comprising generating an error signal when the compliance result indicates that the memory protection rule does not comply with the first entry.

5. The method of claim 1, wherein the memory protection rule includes a first memory region and a first access permission.

6. The method of claim 5, wherein the memory protection rule complies with the first entry when the first access permission is at least as restrictive as a second access permission associated with the first entry.

7. The method of claim 5, wherein the first entry in the first MPU circuit matches the memory protection rule when the first memory region is within a second memory region associated with the first entry.

8. A circuit, comprising:
   an interface to receive a memory protection unit (MPU) configuration request, wherein the MPU configuration request includes a memory protection rule;
   a first circuit to determine a first entry in a first set of entries which matches the memory protection rule;
   a second circuit to determine a compliance result based on checking if the memory protection rule complies with the first entry; and
   a third circuit to store the memory protection rule in a second set of entries based on the compliance result.

9. The circuit of claim 8, wherein the second set of entries is the same as the first set of entries.

10. The circuit of claim 8, wherein the first circuit generates an error signal in response to determining that no entry in the first set of entries matches the memory protection rule.

11. The circuit of claim 8, wherein the second circuit generates an error signal when the compliance result indicates that the memory protection rule does not comply with the first entry.

12. The circuit of claim 8, wherein the memory protection rule includes a first memory region and a first access permission.

13. The circuit of claim 12, wherein the memory protection rule complies with the first entry when the first access permission is at least as restrictive as a second access permission associated with the first entry.

14. The circuit of claim 8, wherein the first entry matches the memory protection rule when a first memory region associated with the memory protection rule is within a second memory region associated with the first entry.

15. A non-transitory computer-readable medium comprising stored instructions, which when executed by a processor, cause the processor to generate a digital representation of a circuit, the circuit comprising:
   an interface to receive a memory protection unit (MPU) configuration request, wherein the MPU configuration request includes a memory protection rule, and wherein the memory protection rule includes a first memory region and a first access permission;
   a first circuit to determine a first entry in a first set of entries which matches the memory protection rule;
   a second circuit to determine a compliance result based on checking if the memory protection rule complies with the first entry; and
   a third circuit to store the memory protection rule in a second set of entries based on the compliance result.

16. The non-transitory computer-readable medium of claim 15, wherein the second set of entries is the same as the first set of entries.

17. The non-transitory computer-readable medium of claim 15, wherein the first circuit generates an error signal in response to determining that no entry in the first set of entries matches the memory protection rule.

18. The non-transitory computer-readable medium of claim 15, wherein the second circuit generates an error signal when the compliance result indicates that the memory protection rule does not comply with the first entry.

19. The non-transitory computer-readable medium of claim 15, wherein the memory protection rule complies with the first entry when the first access permission is at least as restrictive as a second access permission associated with the first entry.

20. The non-transitory computer-readable medium of claim 15, wherein the first entry matches the memory protection rule when the first memory region associated with the memory protection rule is within a second memory region associated with the first entry.

* * * * *